United States Patent
Jang

(10) Patent No.: US 7,523,325 B2
(45) Date of Patent: Apr. 21, 2009

(54) POWER CONTROL SYSTEM AND METHOD, AND MAIN AND AUXILIARY DEVICES APPLIED TO THE SAME

(75) Inventor: Hye-on Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 11/346,192

(22) Filed: Feb. 3, 2006

(65) Prior Publication Data

US 2006/0179335 A1 Aug. 10, 2006

(30) Foreign Application Priority Data

Feb. 4, 2005 (KR) ............... 10-2005-0010640

(51) Int. Cl.
*G06F 1/26* (2006.01)
*G06F 1/32* (2006.01)
(52) U.S. Cl. .................. 713/310; 713/300; 713/320
(58) Field of Classification Search .......... 713/300–324
See application file for complete search history.

(56) References Cited

U.S. PATENT DOCUMENTS 5,799,196 A 8/1998 Flannery
5,842,027 A * 11/1998 Oprescu et al. ............. 713/300
6,301,674 B1 * 10/2001 Saito et al. ................. 713/340
7,024,567 B2 * 4/2006 Kim et al. .................. 713/300
2003/0037269 A1 * 2/2003 Baker et al. ................ 713/320

FOREIGN PATENT DOCUMENTS

JP 2000-029544 1/2000

* cited by examiner

*Primary Examiner*—Dennis M Butler
(74) *Attorney, Agent, or Firm*—Sughrue Mion, PLLC

(57) ABSTRACT

A power control system and method, and main device and auxiliary device applied to the same. The power control system includes plural auxiliary devices for collecting a predetermined first power information, and a main device connected to the auxiliary devices through a local cable. The main device receives the first power information from the auxiliary devices decides the second power information, and controls the auxiliary devices to operate according to the second power information. Thus, the power control system can efficiently control power usage between the main and auxiliary devices connected through the local cable.

17 Claims, 2 Drawing Sheets

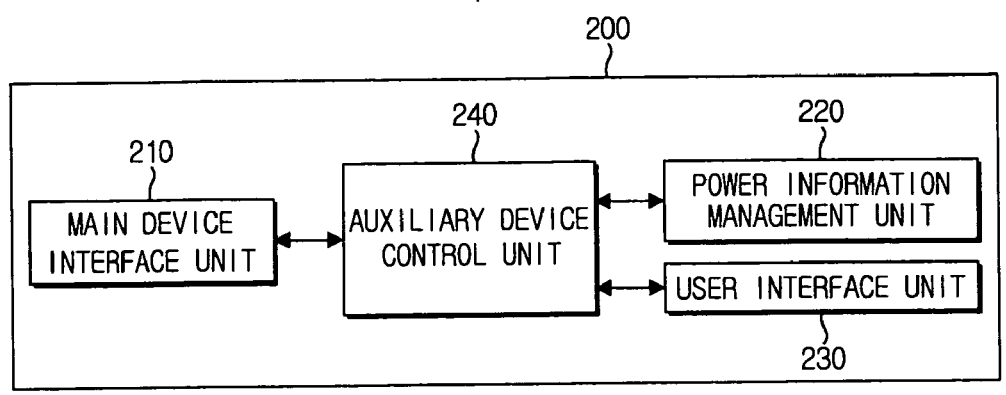
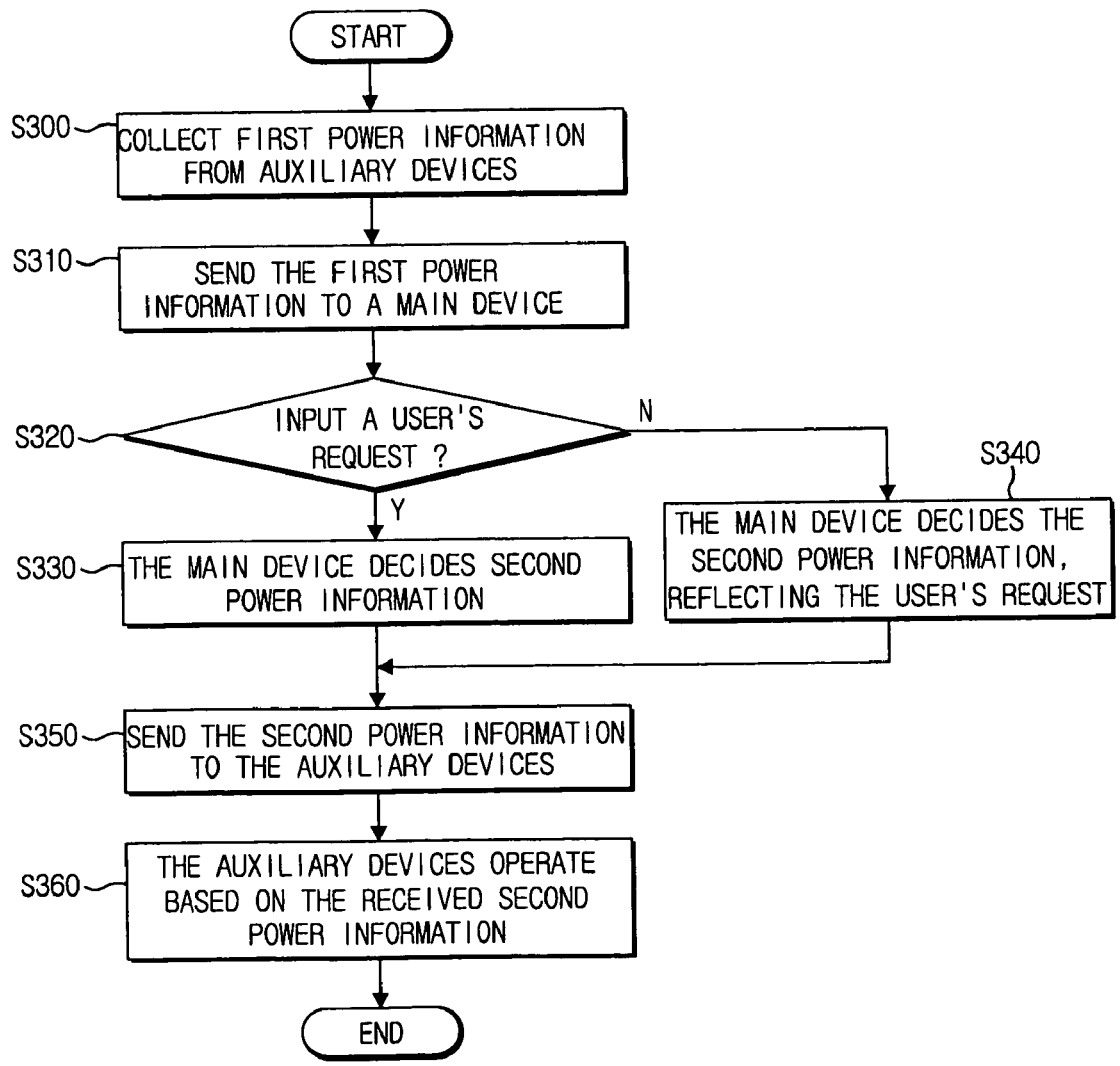

POWER CONTROL SYSTEM AND METHOD, AND MAIN AND AUXILIARY DEVICES APPLIED TO THE SAME

CROSS-REFERENCE TO RELATED APPLICATIONS

This application claims benefit under 35 U.S.C. § 119 from Korean Patent Application No. 2005-10640, filed on Feb. 4, 2005, the entire contents of which are incorporated herein by reference.

BACKGROUND OF THE INVENTION

1. Field of the Invention

The present invention relates to a power control system and method for efficiently distributing power to plural auxiliary devices by a main device connecting the auxiliary devices, and main and auxiliary devices applied to the same.

2. Description of the Related Art

As digital devices are diversified, more digital devices are used at homes and offices. It is a trend to maximize the functions of the respective digital devices through connecting the same for convenience in use, as the plural digital devices are used as stated above.

However, various problems are caused when conventional digital devices are connected together and controlled at the same time.

In detail, there exists limitations to connections of the plural conventional digital devices since the digital devices provide an interface for limited functions. For example, there are limitations to the number of digital devices that can be connected together.

Since digital devices can require different power amounts, it is necessary to adjust the power amount supplied to each device when plural digital devices are connected together for use. To determine the power to be supplied to each digital device, a conventional method is to adjust the power amount for each of the devices connected together to the power amount of the most power-consuming device.

Digital devices can be designed with a maximum power amount such that power can be supplied that is greater than the required power, and therefore digital devices which are connected together can be controlled even on the worst occasions.

As stated above, since the plural digital devices use limited power or use excessive power when the digital devices are connected together for operations according to conventional methods, the power consumption amount of each digital device increases due to controls occurring at the same time. Further, since all the digital devices connected together are kept turned on, a problem occurs that power is consumed even when a device is not in use.

SUMMARY OF THE INVENTION

The present invention has been developed in order to solve the above drawbacks and other problems associated with the conventional arrangement. An aspect of the present invention is to provide a power control system and method for enabling a main device connecting plural auxiliary devices to decide a power consumption amount required for every auxiliary device and to efficiently distribute necessary power to the auxiliary devices for their operations, and to provide main and auxiliary devices applied to the same.

The foregoing and other objects and advantages are substantially realized by providing a power control system, comprising plural auxiliary devices for collecting a predetermined first power information; and a main device connected to the auxiliary devices through local cable, and for inputting the first power information from the auxiliary devices, deciding second power information, and controlling the auxiliary devices to operate according to the decided second power information.

The foregoing and other objects and advantages are substantially realized by providing a power control method for a power control system having a plurality of auxiliary devices and a main device connecting the auxiliary devices through a local cable, the method comprising collecting a first power information from the auxiliary devices and sending the first power information to the main device; deciding second power information based on the first power information sent to the main device, and sending the decided second power information to the plurality of auxiliary devices; and operating the plurality of auxiliary devices based on the second power information.

Preferably, the first power information contains at least one of a power consumption amount and an available power amount for each of the plurality of auxiliary devices, and the second power information contains power amounts to be distributed to the plurality of auxiliary devices.

Preferably, the second power information is an operation mode for each of the plurality of auxiliary devices, and the operation mode is any of a general mode and a sleep mode.

Further, a main device for a power control system, comprising an auxiliary device interface unit configured to receive first power information from a plurality of auxiliary devices connected through a local cable; and a main device control unit configured to decide second power information based on the inputted first power information, and to control the auxiliary device interface unit to send the decided second power information to the plurality of auxiliary devices.

Preferably, the main device control unit includes a multiplexer for extracting only certain data from the inputted first power information.

Further, the main device further comprises a user interface unit configured to recieve a request from a user. Here, the main device control unit decides the second power information, reflecting the inputted user's request.

Preferably, the main device further comprises a storage unit configured to store the inputted first power information.

The foregoing and other objects and advantages are substantially realized by providing an auxiliary device, comprising a power information management unit configured to collect first power information; a main device interface unit configured to send the collected first power information to a main device connected through a local cable; and an auxiliary device control unit for, if second power information is inputted through the main device interface unit, controlling the power information management unit to operate based on the inputted second power information.

Preferably, the auxiliary device further comprises a user interface unit configured to receive a request from a user.

BRIEF DESCRIPTION OF THE DRAWINGS

The above aspects and features of the present invention will be more apparent by describing certain embodiments of the present invention with reference to the accompanying drawings, in which:

FIG. 3 is a block diagram for showing an auxiliary device according to an exemplary embodiment of the present invention; and FIG. 4 is a flow chart for explaining a power control method according to an exemplary embodiment of the present invention.

DETAILED DESCRIPTION OF THE EXEMPLARY EMBODIMENTS

Figure 1:
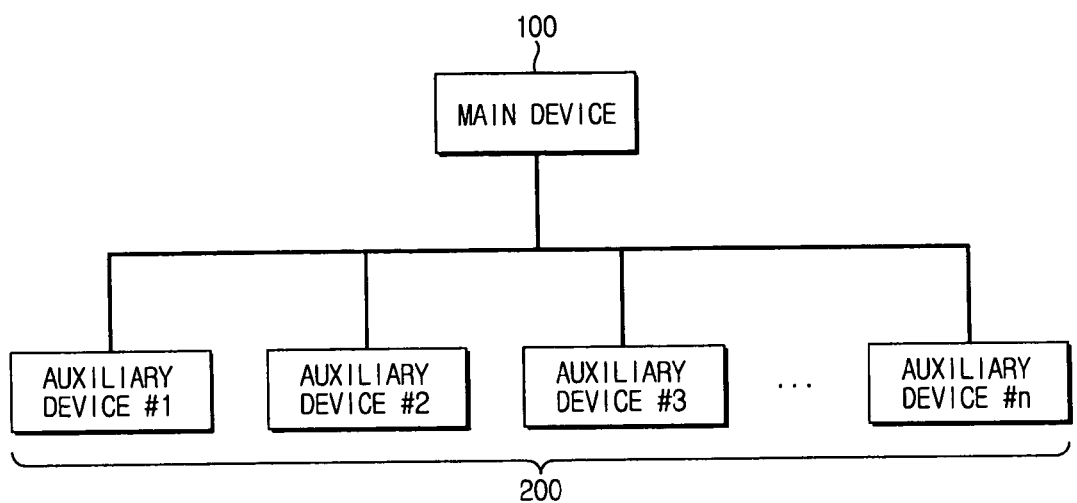
FIG. 1 is a block diagram for explaining a power control system according to an exemplary embodiment of the present invention.

Exemplary embodiments of the present invention will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

FIG. 1 is a block diagram for explaining a power control system according to one embodiment of the present invention.

In FIG. 1, the power control system has a main device 100 and plural auxiliary devices 200 connected to the main device 100 through a local cable. Here, the local cable connecting the main device 100 and the auxiliary devices 200 may be a Universal Serial Bus (USB) cable.

First power information is input to the main device 100 from the plural auxiliary devices 200 connected through the local cable. The main device 100 then decides second power information applied for operations of the respective auxiliary devices 200 based on the inputted first power information. The main device 100 will be described in more detail with reference to FIG. 2.

The plural auxiliary devices 200, denoted as auxiliary devices #1 to #n, are connected to the main device 100 through the local cable, such as USB cable. The auxiliary devices 200 send the first power information to the main device 100 through the local cable, and operate according to the second power information decided by the main device 100. Auxiliary devices 200 will be described in more detail with reference to FIG. 3.

Here, the first power information contains at least one of a power consumption amount and an available power amount for the respective auxiliary devices 200, and the second power information contains a power amount allocated to the respective auxiliary devices 200. Further, the second power information can be operation modes of the respective auxiliary devices 200, such as general mode and sleep mode.

A personal computer (PC) may be employed as the main device 100, and the auxiliary devices 200 may be devices that can be connected through the PC and the USB cable. However, the main and auxiliary devices are not limited to such devices. For example, the main and auxiliary devices 100 and 200 can be diverse digital devices such as laptop computers, digital TVs, personal digital assistants (PDAs), MP3 players, digital cameras, camcorders, videotape recorders (VTR), digital versatile disc players (DVD), mobile phones, and so on.

Figure 2:
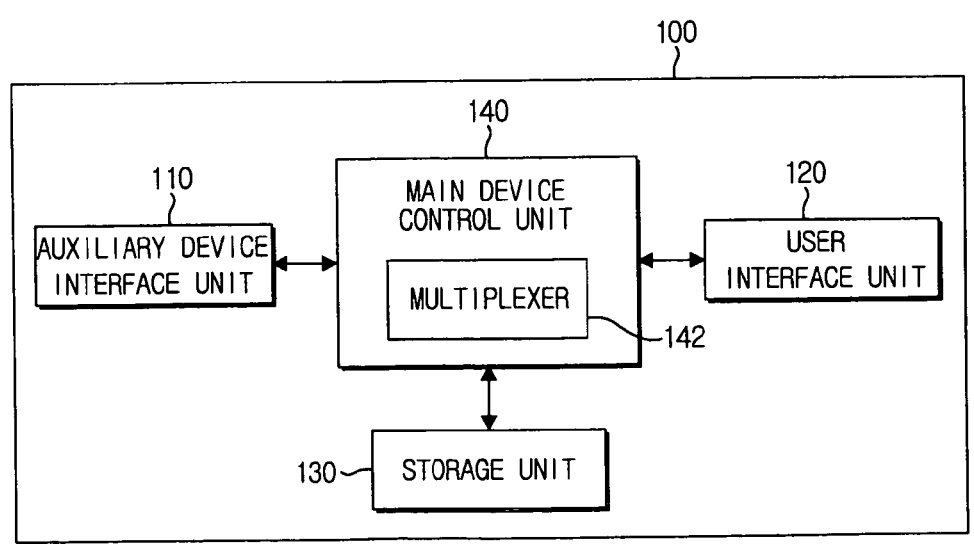
FIG. 2 is a block diagram for showing a main device according to an exemplary embodiment of the present invention.

FIG. 2 is a block diagram for showing a main device according to an embodiment of the present invention.

In FIG. 2, the main device 100 utilized in the power control system according to an embodiment of the present invention has an auxiliary device interface unit 110, a user interface unit 120, a storage unit 130, and a main device control unit 140.

The auxiliary device interface unit 110 receives the input the first power information from respective auxiliary devices 200 connected to the local cable. Further, the auxiliary device interface unit 110 sends to the auxiliary devices 200 the second power information of the respective auxiliary devices 200 decided in the main device control unit 140 which will be later described.

The user interface unit 120 receives as input a request from a user, and sends the inputted user's request to the main device control unit 140. The user's request inputted through the user interface unit 120 may include a usage time for which the user wants to use the auxiliary devices 200. Further, the user interface unit 120 can provide the information that the main device control unit 140 can provide in the form of an on-screen display (OSD) menu or a graphical user interface (GUI) menu provided by a menu-processing unit (not shown).

The storage unit 130 temporarily stores the first power information inputted through the auxiliary device interface unit 110, and provides the first power information as the main device control unit 140 requests, which will be later described.

The main device control unit 140 analyzes the first power information inputted through the auxiliary device interface unit 110, and decides the second power information based on the analysis. For example, the main device control unit 140 can grasp how much longer the respective auxiliary devices 200 can be used based on available power amounts.

Next, the main device control unit 140 controls the auxiliary device interface unit 110 to send the decided second power information to the corresponding auxiliary devices 200. Here, the second power information decided by the main device control unit 140 can be a power amount allocated to the respective auxiliary devices 200 or an operation mode of the respective auxiliary devices 200, such as general mode or sleep mode.

Preferably, the main device control unit 140 includes a multiplexer 142. The multiplexer 142 performs a function of extracting only certain data from the first power information inputted through the auxiliary device interface unit 110.

The 'certain data' is used for determining the second power information from the first power information, and the multiplexer operates to extract only the data required to determine the second power information from the first power information.

Further, if a user's request is inputted through the user interface unit 120, the main device control unit 140 decides the second power information, reflecting the first power information and the user's request inputted through the user interface unit 120. Next, the main device control unit 140 controls the auxiliary device interface unit 110 to send the decided second power information to the corresponding auxiliary devices 200.

For example, it is assumed that the auxiliary devices #1 to #n are connected to the main device 100 as shown in FIG. 1 and that the auxiliary devices #1 and #2 do not perform any function and the auxiliary device #3 has inefficient power for ongoing operations, which, as a result, causes the main device control unit 140 to analyze the first power information sent from the auxiliary devices 200. Further, it is assumed that a request is inputted from a user wishing to operate the auxiliary device #n for two hours through the user interface unit 120.

Under the above conditions, the main device control unit 140 turns off or operates the auxiliary devices #1 and #2 in the sleep mode, and configures the second power information to enable the power for the auxiliary devices #1 and #2 to be used for the auxiliary devices #3 and #n.

FIG. 3 is a block diagram for showing an auxiliary device according to one embodiment of the present invention.

In FIG. 3, the auxiliary devices 200 each have a main device interface unit 210, a power information management unit 220, a user interface unit 230, and an auxiliary device control unit 240.

The main device interface unit 210 sends the first power information collected by the power information management unit 220, which will be later described, to the main device 100 through the local cable. Further, the main device interface unit 210 receives the second power information sent from the main device 100 and sends the same to the auxiliary device control unit 240 which will be later described.

The power information management unit 220 collects the first power information from blocks (not shown) performing respective functions of the auxiliary device 200, and sends the collected first power information to the main device 100 through the main device interface unit 210. Further, the power information management unit 220 can also send the collected first power information to the auxiliary device control unit 240 which will be later described. Here, the first power information can contain at least one of a power consumption amount and an available power amount for each block of the auxiliary device 200 performing its function.

The user interface unit 230 provides an interface between the auxiliary devices 200 and the user and inputs a request from a user. In the present embodiment, a user's request is inputted through the user interface unit 230 when the main device 100 connected to the auxiliary devices 200 is turned off, and, likewise, the user interface unit 230 remains turned off when the main device 100 is turned on.

If the second power information sent from the main device 100 is inputted through the main device interface unit 210, the auxiliary device control unit 240 controls the power information management unit 220 to operate each block of the auxiliary device 200, based on the inputted second power information.

FIG. 4 is a flow chart for explaining a power control method according to an embodiment of the present invention. Here, description will be made with reference to FIG. 1 to FIG. 4 of a power control method according to an embodiment of the present invention.

The power information management unit 220 of the auxiliary device 200 collects the first power information, such as a power consumption amount and an available power amount for each block of the auxiliary device 200 required to perform its function (S300), and sends the collected first power information to the main device 100 through the main device interface unit 210 (S310).

The first power information sent through the main device interface unit 210 of the auxiliary device 200 is inputted to the main device 100 through the auxiliary device interface unit 110 of the main device 100. The first power information inputted through the auxiliary device interface unit 110 is inputted to the main device control unit 140, and the main device control unit 140 decides if a user's request is inputted through the user interface unit 120 (S320).

If the step S320 decides that the user's request is not inputted through the user interface unit 120, the main device control unit 140 of the main device 100 decides the second power information based on the first power information inputted through the auxiliary device interface unit 110 (S330).

If, at step S320, it is determined that the user's request has been input through the user interface unit 120, the main device control unit 140 of the main device 100 decides the second power information, reflecting the first power information inputted through the auxiliary device interface unit 110 and the user's request inputted through the user interface unit 120 (S340).

If the second power information is decided, the main device control unit 140 of the main device 100 controls the auxiliary device interface unit 110 to send the second power information to the auxiliary devices 200 (S350).

The second power information sent through the auxiliary device interface unit 110 of the main device 100 is inputted to the auxiliary device 200 through the main device interface unit 210 of the auxiliary device 200. Next, the auxiliary device control unit 240 controls the power information management unit 220 to operate the auxiliary device 200 based on the sent second power information (S360).

As above, the power control method according to the present invention can maximize the efficiency of power usage, enabling the plural auxiliary devices 200 to use only substantially necessary power amounts as well as enabling power not in use to be distributed to the other auxiliary devices 200.

As aforementioned, the power control system and method, and the main and auxiliary devices applied to the same, according to the present invention, can minimize the waste of electric power together with power efficiently used, enabling the main device to distribute power for auxiliary devices to the other auxiliary devices substantially requiring power up to an appropriate level.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A power control system, comprising:
a plurality of auxiliary devices configured to collect a first power information;
a main device connected to the plurality of auxiliary devices through a local cable, and configured to receive the first power information from the auxiliary devices, to decide second power information, and to control the auxiliary devices to operate according to the decided second power information; and
a user interface unit configured to receive a request from a user, wherein the main device is configured to determine the second power information according to the request from the user, and the request from the user comprises an operation time of one of the plurality of auxiliary devices.

2. The power control system as claimed in claim 1, wherein the local cable is Universal Serial Bus (USB) cable.

3. The power control system as claimed in claim 1, wherein the first power information contains at least one of a power consumption amount and an available power amount for each of the plurality of auxiliary devices.

4. The power control system as claimed in claim 1, wherein the second power information contains power amounts to be distributed to the plurality of auxiliary devices.

5. The power control system as claimed in claim 1, wherein the second power information comprises an operation mode for each of the plurality of auxiliary devices.

6. The power control system as claimed in claim 5, wherein the operation mode is any of a general mode and a sleep mode.

7. The power control system as claimed in claim 1, wherein the request from the user is initiated by the user and includes a usage of time of operating the auxiliary device in a particular operation mode.

8. The power control system as claimed in claim 1, wherein the request is a time at which the auxiliary device will change from a first operation mode to a second operation mode and the request includes a duration of time for operating under the second operation mode.

9. A power control method for a power control system having a plurality of auxiliary devices and a main device connecting the plurality of auxiliary devices through a local cable, the method comprising:
- collecting a first power information from the auxiliary devices and sending the first power information to the main device;
- deciding second power information based on the first power information sent to the main device, and sending the decided second power information to the plurality of auxiliary devices;
- operating the plurality of auxiliary devices based on the second power information; and
- receiving a request from a user, wherein the second power information is decided according to the request from the user, and the request from the user comprises an operation time of one of the plurality of auxiliary devices.

10. The power control method as claimed in claim 9, wherein the first power information contains at least one of a power consumption amount and an available power amount for each of the plurality of auxiliary devices.

11. The power control method as claimed in claim 9, wherein the second power information contains power amounts to be distributed to the plurality of auxiliary devices.

12. The power control method as claimed in claim 9, wherein the second power information comprises an operation mode for each of the plurality of auxiliary devices.

13. The power control method as claimed in claim 12, wherein the operation mode is any of a general mode and a sleep mode.

14. A main device for a power control system, comprising:
- an auxiliary device interface unit configured to receive first power information from a plurality of auxiliary devices connected through a local cable;
- a main device control unit configured to determine a second power information based on the first power information, and to control the auxiliary device interface unit to send the second power information to the plurality of auxiliary devices; and
- a user interface unit configured to receive a request from a user, wherein the main device control unit is configured to determine the second power information according to the request from the user, and the request from the user comprises an operation time of one of the plurality of auxiliary devices.

15. The main device as claimed in claim 14, wherein the main device control unit includes a multiplexer for extracting only certain data from the first power information.

16. The main device as claimed in claim 14, further comprising a storage unit configured to store the first power information.

17. An auxiliary device, comprising:
- a power information management unit configured to collect first power information;
- a main device interface unit configured to send the collected first power information to a main device connected through a local cable;
- an auxiliary device control unit configured to, if second power information is inputted through the main device interface unit, control the power information management unit to operate based on the inputted second power information; and
- a user interface unit configured to receive a request from a user, wherein the main device control unit is configured to determine the second power information according to the request from the user, and the request from the user comprises an operation time of one of the plurality of auxiliary devices.

* * * * *